United States Patent
Sugioka

(10) Patent No.: US 10,237,131 B2
(45) Date of Patent: Mar. 19, 2019

(54) COMMUNICATION ADAPTER AND PROGRAM UPDATE METHOD FOR COMMUNICATION ADAPTER

(71) Applicant: NORITZ CORPORATION, Hyogo (JP)

(72) Inventor: Masayuki Sugioka, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 22 days.

(21) Appl. No.: 15/622,655

(22) Filed: Jun. 14, 2017

(65) Prior Publication Data

US 2018/0367378 A1    Dec. 20, 2018

(51) Int. Cl.
| | |
|---|---|
| *G06F 8/65* | (2018.01) |
| *G06F 8/656* | (2018.01) |
| *H04L 12/24* | (2006.01) |
| *H04L 29/08* | (2006.01) |

(52) U.S. Cl.
CPC ............ *H04L 41/082* (2013.01); *G06F 8/65* (2013.01); *G06F 8/656* (2018.02); *G06F 8/66* (2013.01); *H04L 41/0886* (2013.01); *H04L 67/12* (2013.01); *H04L 67/34* (2013.01)

(58) Field of Classification Search
CPC ........................................................ G06F 8/65
USPC ........................................................ 717/173
See application file for complete search history.

(56) References Cited

U.S. PATENT DOCUMENTS

| | | | | |
|---|---|---|---|---|
| 8,607,215 | B2 * | 12/2013 | Natsume ................. | G06F 8/65 717/168 |
| 9,678,742 | B2 * | 6/2017 | Kanematsu ............. | G06F 8/65 |
| 2004/0024917 | A1 * | 2/2004 | Kennedy ................. | G06F 8/65 710/1 |

(Continued)

FOREIGN PATENT DOCUMENTS

| | | |
|---|---|---|
| JP | 2008-146550 A | 6/2008 |
| JP | 2012-199751 A | 10/2012 |

(Continued)

OTHER PUBLICATIONS

"Installing Firmware using Boot Loader Menu"; FortiDB 5.0.0 Handbook; fortinet.com website [full URL in ref.]; Jul. 11, 2013 (Year: 2013).*

*Primary Examiner* — Qing Chen
*Assistant Examiner* — Clint Thatcher
(74) *Attorney, Agent, or Firm* — Studebaker & Brackett PC

(57) ABSTRACT

A communication adapter includes: a communication circuit configured to receive and transmit information from and to an external apparatus via a communication network; a memory including a plurality of program storage areas whose stored contents are rewritable; and a controller. When a program update process is started up during execution of a program stored in a first program storage area of the plurality of program storage areas selected at the time of a startup process, the controller executes a process of writing an update program received by the communication circuit from the external apparatus into a second program storage area different from the first program storage area. When the process of writing ends normally, the controller re-executes the startup process with the update program read from the second program storage area.

4 Claims, 12 Drawing Sheets

(56) References Cited

U.S. PATENT DOCUMENTS

| | | | | |
|---|---|---|---|---|
| 2007/0168905 A1* | 7/2007 | Bromley | ............... | G06F 8/20 |
| | | | | 717/100 |
| 2012/0291021 A1* | 11/2012 | Banerjee | ............. | G06F 8/654 |
| | | | | 717/173 |
| 2015/0317148 A1 | 11/2015 | Ohashi | | |
| 2017/0060559 A1* | 3/2017 | Ye | ............... | G06F 8/65 |
| 2018/0189049 A1* | 7/2018 | Madrid | .................. | G06F 8/65 |

FOREIGN PATENT DOCUMENTS

| | | |
|---|---|---|
| JP | 2015-210808 A | 11/2015 |
| JP | 2017-058026 A | 3/2017 |

\* cited by examiner

FIG.11

|  | Fst0 | Fst1 |
|---|---|---|
| AT THE TIME OF SHIPMENT FROM FACTORY | WRITE "PREDETERMINED VALUE" | — |
| S120 (FIG. 5) | ERASE IN UPDATE PARTITION | |
| S180 (FIG. 5) | WRITE "PREDETERMINED VALUE" IN UPDATE PARTITION | |
| S310, S360 (FIG. 7) | CHECK WHETHER OR NOT "PREDETERMINED VALUE" HAS BEEN WRITTEN (REWRITE) | — |
| S320, S370 (FIG. 7) | — | CHECK WHETHER OR NOT "PREDETERMINED VALUE" HAS BEEN WRITTEN (REWRITE) |

COMMUNICATION ADAPTER AND PROGRAM UPDATE METHOD FOR COMMUNICATION ADAPTER

BACKGROUND OF THE INVENTION

Field of the Invention

The present disclosure relates to a communication adapter and a program update method for the communication adapter. More particularly, the present disclosure relates to the technique of updating a program executed in a communication adapter used in a remote management system for a hot water using facility (such as, for example, a water heater, a multi-water heating system, a reheating system for water in a bath, a filtering apparatus, or a hot water heating apparatus).

Description of the Background Art

Japanese Patent Laying-Open No. 2017-58026 describes a remote management system for a multi-water heating system that is one example of a hot water using facility. In the remote management system described in Japanese Patent Laying-Open No. 2017-58026, various pieces of information about the water heating system are transmitted to a management center (server) by a communication adapter communicatively connected to the water heating system.

For example, the communication adapter is communicatively connected to the water heating system via a two-wire communication line, and is connected by wireless communication to a router connected to a communication network such as the Internet. Since the communication adapter is communicatively connected to the router and to the management center (server) via the communication network, bidirectional information transmission between the water heating system and the management center via the communication network is possible.

A prestored program is executed in the communication adapter, thereby implementing the information collection function of collecting various pieces of information about the water heating system, the communication function of connecting to the communication network, the information transmission function of transmitting the information collected from the water heating system to the management center (server) by using these functions, and others. Therefore, by updating the program stored in the communication adapter, the functions of the communication adapter can be upgraded.

The simplest method of updating the program is a method for an operator to perform the update operation directly on the communication adapter. According to this method, the operator performs the update operation with the communication adapter stopped, and thereafter, the communication adapter is restarted. Therefore, the communication adapter can be operated in accordance with the updated program. However, dispatch of the operator is required, which causes an increase in work load and cost.

Therefore, it is preferable to be able to update the program of the communication adapter by remote operation, e.g., by automatic distribution from the management center (server) via the communication network, without requiring the operator. In this case, it is necessary to establish a process for automatically updating the program without stopping the communication adapter.

SUMMARY OF THE INVENTION

An object of the present disclosure is to remotely update, via a communication network, a program executed in a communication adapter used in a remote management system for a hot water using facility.

According to an aspect of the present disclosure, a communication adapter connected to a hot water using facility via a communication line includes: a communication circuit; a memory; and a controller. The communication circuit is configured to receive and transmit information from and to an external apparatus via a communication network. The memory includes a plurality of program storage areas whose stored contents are rewritable. The controller is configured to operate the communication adapter by execution of a program stored in any one of the plurality of program storage areas specified at the time of a startup process. When a program update process is started up during execution of a program stored in a first program storage area of the plurality of program storage areas, the controller executes a process of writing an update program received by the communication circuit from the external apparatus into a second program storage area, the second program storage area being a program storage area of the plurality of program storage areas different from the first program storage area. When the process of writing ends normally, the controller specifies the second program storage area and re-executes the startup process.

According to another aspect of the present disclosure, a program update method for a communication adapter connected to a hot water using facility via a communication line, and being able to receive and transmit information from and to an external apparatus via a communication network includes: starting up a program update process in accordance with the information from the external apparatus during operation of the communication adapter by execution of a program stored in any one of a plurality of program storage areas specified at the time of a startup process, stored contents of the plurality of program storage areas being rewritable; when the program update process is started up during execution of a program stored in a first program storage area of the plurality of program storage areas, executing a process of writing an update program distributed from the external apparatus into a second program storage area different from the first program storage area; and when the process of writing the update program into the second program storage area ends normally, specifying the second program storage area and re-executing the startup process.

Accordingly, a main advantage of the present disclosure is to be able to remotely update, via the communication network, the program executed in the communication adapter used in the remote management system for the hot water using facility.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 11 is a table showing a list of processes executed on program storage state data.

DESCRIPTION OF THE PREFERRED EMBODIMENTS

Figure 1:
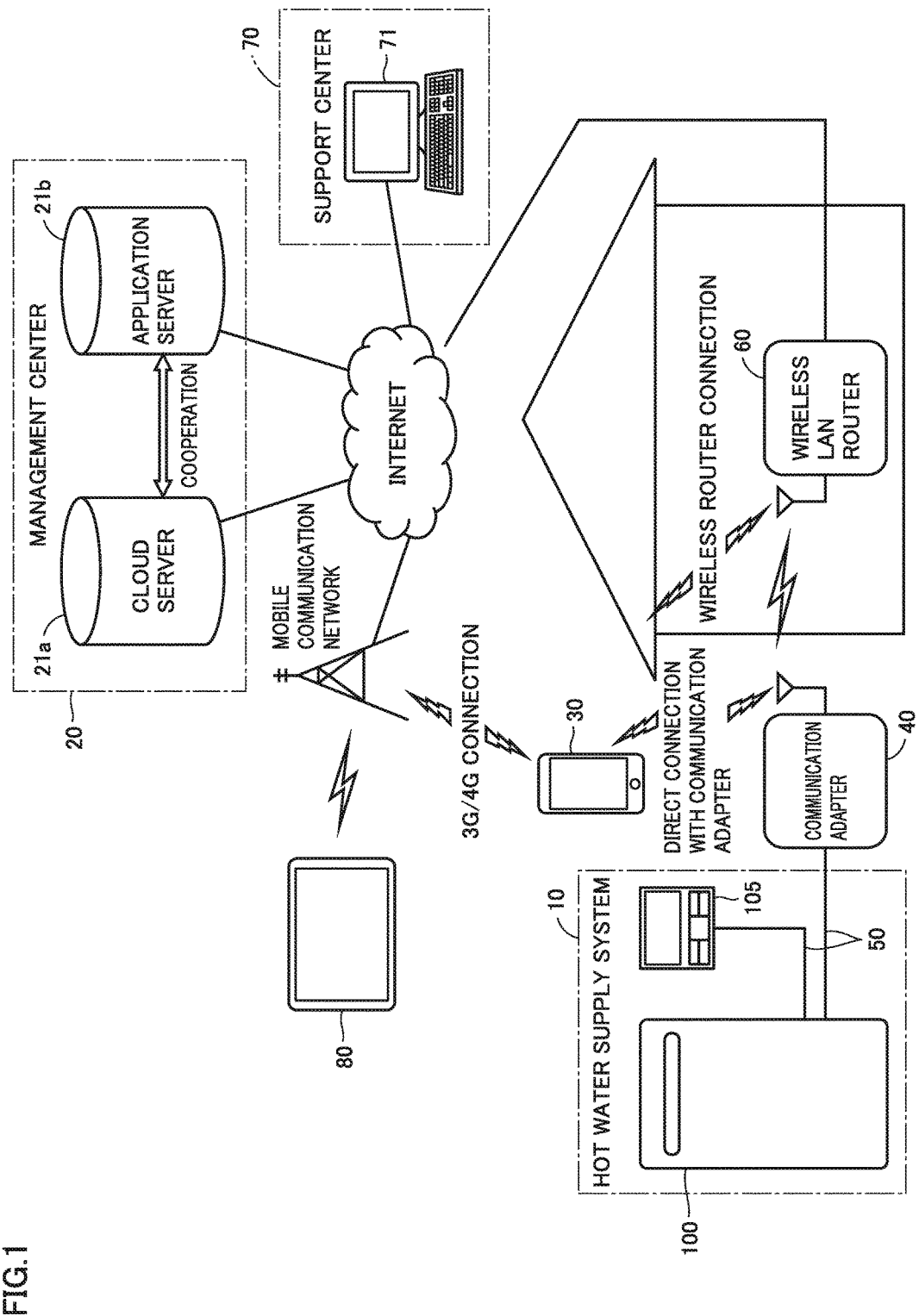
FIG. 1 is a block diagram showing a configuration example of a remote management system for a hot water using facility to which a communication adapter according to the present embodiment is applied.

Embodiments of the present disclosure will be described in detail below with reference to the drawings, in which the same or corresponding portions are denoted by the same reference characters and description thereof will not be repeated in principle.

First Embodiment

FIG. 1 is a block diagram showing a configuration example of a remote management system for a hot water using facility to which a communication adapter according to the present embodiment is applied.

Referring to FIG. 1, a hot water supply system 10 includes a hot water supply apparatus 100 that is one example of the hot water using facility, and a remote controller 105 configured to input an instruction to operate hot water supply apparatus 100. In the present embodiment, hot water supply apparatus 100 is a target of remote management.

In hot water supply system 10, hot water supply apparatus 100 and remote controller 105 are connected to be communicable with each other via a two-wire communication line 50. More specifically, a controller (not shown) including a microcomputer and the like is built into each of hot water supply apparatus 100 and remote controller 105, and these controllers are configured to be able to perform serial communication with each other via two-wire communication line 50 in accordance with a predetermined communication protocol. In addition, hot water supply apparatus 100 can be configured to output a power source voltage for an external apparatus to two-wire communication line 50. In this case, the communication data can be superimposed on the power source voltage.

Furthermore, the controller of hot water supply apparatus 100 is connected to a communication adapter 40 via two-wire communication line 50. For example, hot water supply system 10 and communication adapter 40 can be placed outside, e.g., in the vicinity of an outer wall of a house, in a garage and the like. Communication adapter 40 has the wireless communication function for communicating with a wireless LAN (Local Area Network) router 60 arranged inside in accordance with a predetermined communication protocol (such as, for example, IEEE 802.11n). The details of communication adapter 40 will be described later.

Wireless LAN router 60 is connected to the Internet network (communication network). Wireless LAN router 60 can also function as a wireless LAN master unit so as to wirelessly connect a plurality of wireless LAN slave units.

A smartphone 30 and communication adapter 40 can operate as wireless LAN slave units, and can be connected to the Internet via wireless LAN router 60 when a wireless link to wireless LAN router 60 is established. Smartphone 30 is configured to be connected to the Internet network via the mobile communication network such as the 4G line and the 3G line when the Internet connection via wireless LAN router 60 is impossible.

Furthermore, in the remote management system for the hot water using facility according to the present embodiment, a management center 20 and a support center 70 are connected to the Internet network (communication network). Management center 20 includes a cloud server 21a and an application server 21b. Cloud server 21a and application server 21b are connected to be communicable with each other via the Internet network or a dedicated line, and can provide various services in cooperation with each other.

Figure 2:
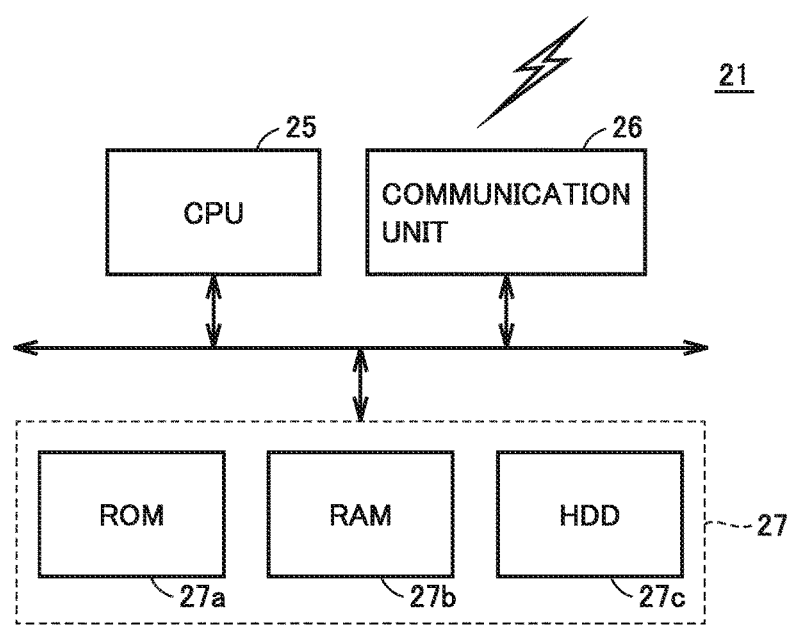
FIG. 2 is a schematic configuration diagram of a server device forming a cloud server and an application server shown in FIG. 1.

FIG. 2 is a schematic configuration diagram of a server device 21 forming cloud server 21a and application server 21b.

Referring to FIG. 2, server device 21 includes a CPU (Central Processing Unit) 25 configured to control the entire device, and a communication unit 26 and a memory 27 connected to CPU 25. Communication unit 26 has the function of communicating with another device or server by communication connected to the communication network (Internet).

Memory 27 includes, for example, a ROM (Read Only Memory) 27a that is a memory configured to store a program executed on CPU 25, a RAM (Random Access Memory) 27b that is a memory configured to serve as a work area when executing the program on CPU 25 or store a calculated value, and an HDD (Hard Disk Drive) 27c that is one example of a large-size storage device.

Server device 21 can be configured to have the function corresponding to a general computer. Server device 21 may further include at least one of a display and an operation unit configured to accept an operation input.

Referring again to FIG. 1, multiple communication adapters 40 placed in respective households are constantly connected to cloud server 21a and cloud server 21a communicates with these communication adapters 40, whereby cloud server 21a mainly collects and manages various pieces of information about hot water supply systems 10 in the respective households. For example, the collected information can include an amount of supplied hot water per unit time and an amount of fuel consumption per unit time, a temperature of supplied hot water, the error information occurring in each hot water supply system 10, and the like.

Application server 21b manages multiple user accounts for multiple users in the respective households, and accepts a login from an operation terminal such as smartphone 30 owned by each user and provides various services to the operation terminal owned by each user.

Preferably, dedicated application software for using the services provided by application server 21b is installed onto smartphone 30, such that the login operation and various operations after login can be performed using this application software. Alternatively, the services may also be provided on a Web basis, such that the login operation and the other operations can be performed using the appropriate Web browser.

Application server 21b can also be configured such that application server 21b provides only an application service for the user terminal such as smartphone 30 and the customer information including the user accounts is managed by another customer information management center. Alternatively, cloud server 21a and application server 21b may be configured by an integrated server device.

The services provided by cloud server 21a and application server 21b can be appropriately designed as needed. For example, the connected apparatus checking service, the operation information collecting and managing service, the error monitoring service, the maintenance monitoring service, the remote operation service and the like can be provided.

In accordance with the connected apparatus checking service, the type and the system configuration of hot water supply apparatus 100 of hot water supply system 10 connected to communication adapter 40 can be checked. Based on the information collected from hot water supply system 10 by communication adapter 40, the type and the system configuration can be determined on the server side.

In accordance with the operation information collecting and managing service, the operation information about hot water supply system 10 can be periodically collected from communication adapter 40 and managed every unit time (e.g., every one hour). Although the collected operation information is arbitrary, a cumulative amount of supplied hot water or a cumulative amount of fuel consumption per unit time can, for example, be collected. The collected operation information can also be used to create development materials based on big data analysis.

In accordance with the error monitoring service, when an error occurs in hot water supply system 10, the information about the error can be obtained from communication adapter 40 and notification of the error can be provided to a terminal 71 of support center 70 or an e-mail address of the user.

In accordance with the maintenance monitoring service, the operating condition of hot water supply system 10 can be monitored in real time at the time of repair of hot water supply system 10 and the like. Specifically, the operating condition of hot water supply system 10 connected to specified communication adapter 40 can be monitored in real time on a tablet terminal 80 and the like of an on-site operator communicatively connected to cloud server 21a.

Furthermore, in the remote management system for the hot water using facility according to the present embodiment, the remote operation service for hot water supply system 10 can be provided.

In accordance with the remote operation service, a predetermined operation of hot water supply system 10, such as, for example, an operation for switching on and off the hot water supply operation and an operation for changing the hot water supply set temperature, can be remotely performed using terminal 71 of support center 70, smartphone 30 owned by the user, and the like. For example, the remote operation by the user can be performed by logging in to application server 21b from smartphone 30 and the like.

In addition, as a part of the services in the remote management system, the operation information collected from communication adapter 40 can also be displayed to be viewable on smartphone 30 in the logged-in state.

Hot water supply system 10 remotely monitored and/or remotely operated by the remote management system according to the present embodiment is communicatively connected to communication adapter 40 via two-wire communication line 50. Communication adapter 40 can collect various pieces of information from hot water supply system 10 and transmit the information to management center 20, and conversely, can receive the information from management center 20. Communication adapter 40 can also output an operation instruction to hot water supply system 10 based on an instruction provided from support center 70 or smartphone 30 owned by the user.

Figure 3:
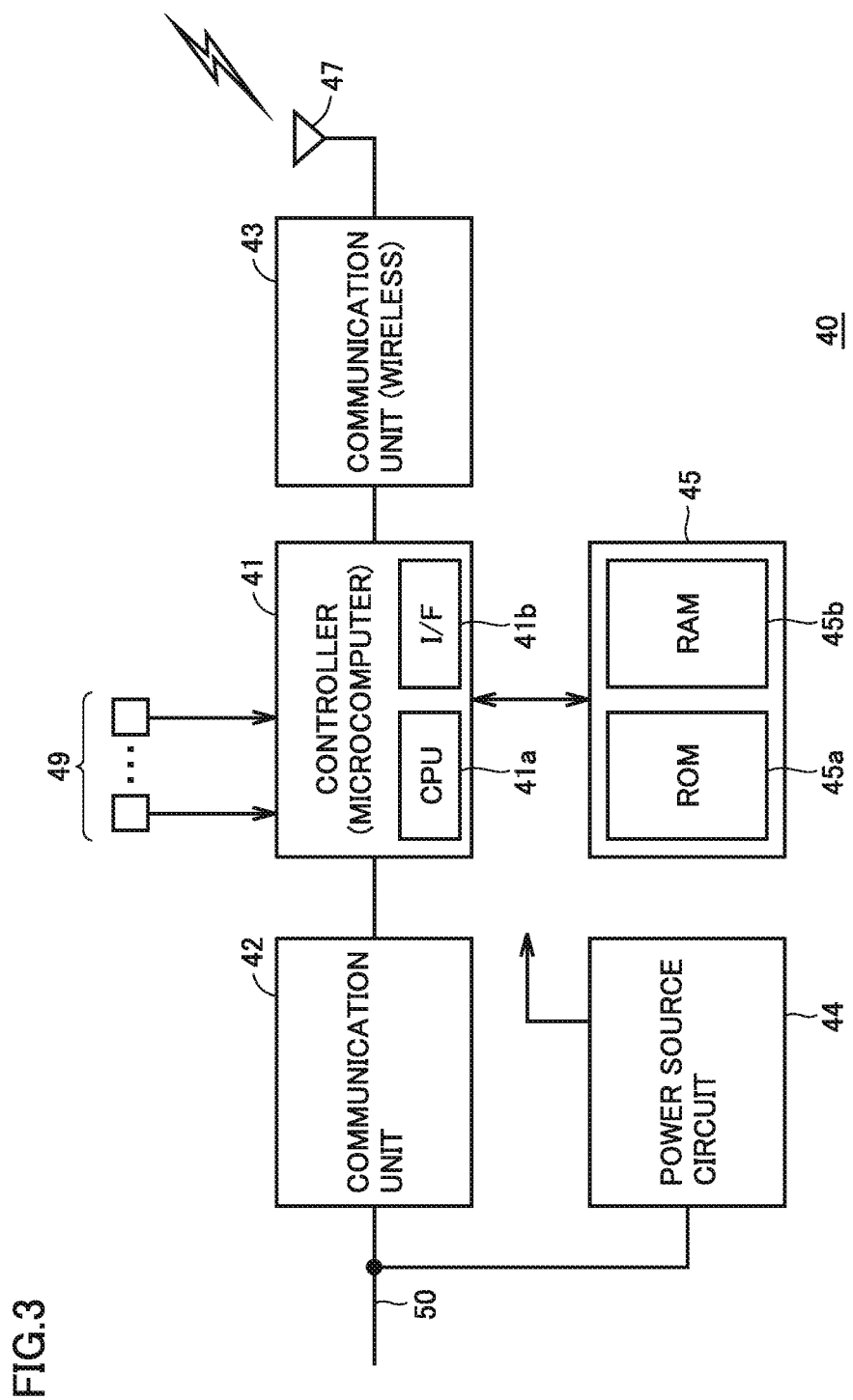
FIG. 3 is a block diagram showing a configuration example of the communication adapter shown in FIG. 1.

FIG. 3 is a block diagram showing a configuration example of communication adapter 40.

Referring to FIG. 3, communication adapter 40 includes a controller 41, communication units 42 and 43, a power source circuit 44, a memory 45, an antenna 47, and a manual switch 49.

Controller 41 can be configured by a microcomputer including a CPU 41a and an interface (I/F) 41b. Communication unit 42 is configured to be able to bidirectionally receive and transmit data from and to hot water supply apparatus 100 and remote controller 105 via two-wire communication line 50. Communication unit 43 is configured to be able to bidirectionally receive and transmit data from and to wireless LAN router 60 and smartphone 30 by wireless communication via antenna 47. Power source circuit 44 is supplied with electric power from two-wire communication line 50 and generates an operating power source voltage for each component in communication adapter 40.

Memory 45 has a ROM 45a and a RAM 45b. ROM 45a is configured by a non-volatile memory (typically a flash memory), and thus, the contents stored in ROM 45a are retained even when communication adapter 40 is powered off. In addition, the contents stored in ROM 45a can be rewritten by controller 41.

RAM 45b is configured by a volatile memory (typically DRAM (Dynamic Random Access Memory)), and thus, the contents stored in RAM 45b are cleared when communication adapter 40 is powered off. Particularly, the contents stored in RAM 45b are initialized at the time of a process of starting up communication adapter 40.

For example, a program for controlling the operation of communication adapter 40 is stored in ROM 45a, and at the time of the startup process, controller 41 reads the program stored in ROM 45a and loads the program into RAM 45b. In the following description, controller 41 executes the program loaded into RAM 45b and controls the operation of communication adapter 40. Although memory 45 and controller 41 are shown as separate components in FIG. 3, a part or all of memory 45 can also be built into controller 41.

Manual switch 49 can be configured by a push switch that can be operated by the user, the operator or the like. In response to the operation of manual switch 49, a predetermined electric signal is input from manual switch 49 to controller 41. Thus, controller 41 can sense the operation of manual switch 49.

Using communication unit 43, communication adapter 40 can periodically communicate with management center 20 via the communication network (Internet). Specifically, communication adapter 40 operates to perform periodic communication (so-called heartbeat communication) with management center 20 when a certain time period (e.g., three minutes) has elapsed since the last communication with management center 20 ended. In response to the heartbeat communication, management center 20 can transmit the necessary information to communication adapter 40. For example, in the case of upgrading the program (so-called firmware) of communication adapter 40, a new program distributed from management center 20 is written into ROM 45a, whereby a program update process can be executed remotely.

In the configuration example of FIG. 3, communication unit 43 corresponds to one example of "communication circuit", ROM 45a corresponds to one example of "memory", and controller 41 configured by the microcomputer corresponds to one example of "controller". In addition, management center 20 corresponds to one example of "external apparatus".

Figure 4:
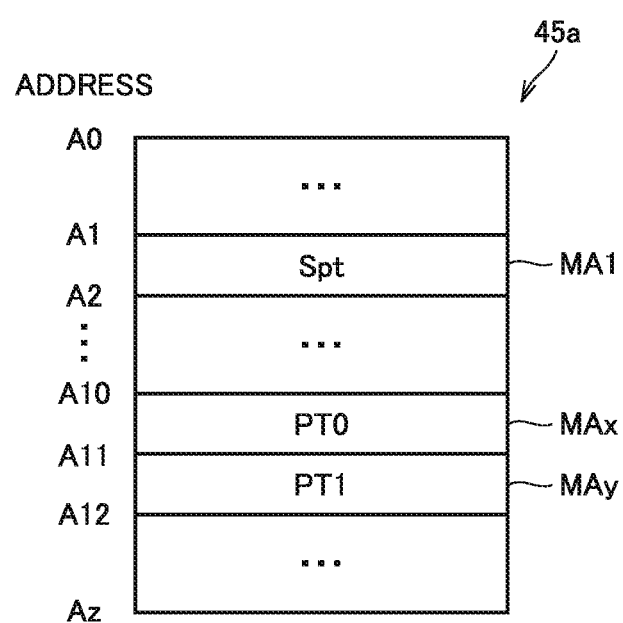
FIG. 4 is a memory map of a ROM shown in FIG. 3.

FIG. 4 is a memory map of ROM 45a shown in FIG. 3.

Referring to FIG. 4, ROM 45a has storage areas divided by addresses A0 to Az. For example, a plurality of program partitions (hereinafter also simply referred to as "partitions") are provided in ROM 45a as areas for storing the program (firmware) to be executed on controller 41. In the example of FIG. 4, a partition PT0 is provided in an address area MAx corresponding to addresses A10 to A11, and a partition PT1 is provided in an address area MAy corresponding to addresses A11 to A12. Partitions PT0 and PT1 correspond to one example of "plurality of program storage areas".

Furthermore, partition selection data Spt is stored in an address area MA1 of ROM 45a corresponding to addresses A1 to A2. Partition selection data Spt is the information for selecting one of partitions PT0 and PT1. For example, partition selection data Spt is configured by a signal of a plurality of bytes, and "0 (hexadecimal notation)" or "1 (hexadecimal notation)" is stored in the first byte of partition selection data Spt.

At the time of the startup process, controller 41 reads partition selection data Spt and reads the stored program from one of partitions PT0 and PT1 in accordance with the value of the first byte of partition selection data Spt. For example, when the first byte of partition selection data Spt is "0 (hexadecimal notation)", the program is read from partition PT0 and loaded into RAM 45b. On the other hand, when the value of the first byte of partition selection data Spt is "1 (hexadecimal notation)" at the time of the startup process, the program read from partition PT1 is loaded into RAM 45b.

After the startup process, controller 41 sequentially executes the program loaded into RAM 45b and thereby controls the operation of communication adapter 40. Therefore, by updating the program stored in partition PT0 or PT1, the above-described functions of communication adapter 40 can be upgraded.

In order to update the program, it is necessary to write a new program into ROM 45a that is a non-volatile memory. In the communication adapter according to the present embodiment, a new program (hereinafter also referred to as "update program") downloaded from management center 20 is stored in ROM 45a and the program is thereby updated. Namely, unlike the program update by the operator, the program is updated without powering off communication adapter 40, and thus, a process for smoothly updating the program during operation of communication adapter 40 is required.

Figure 5:
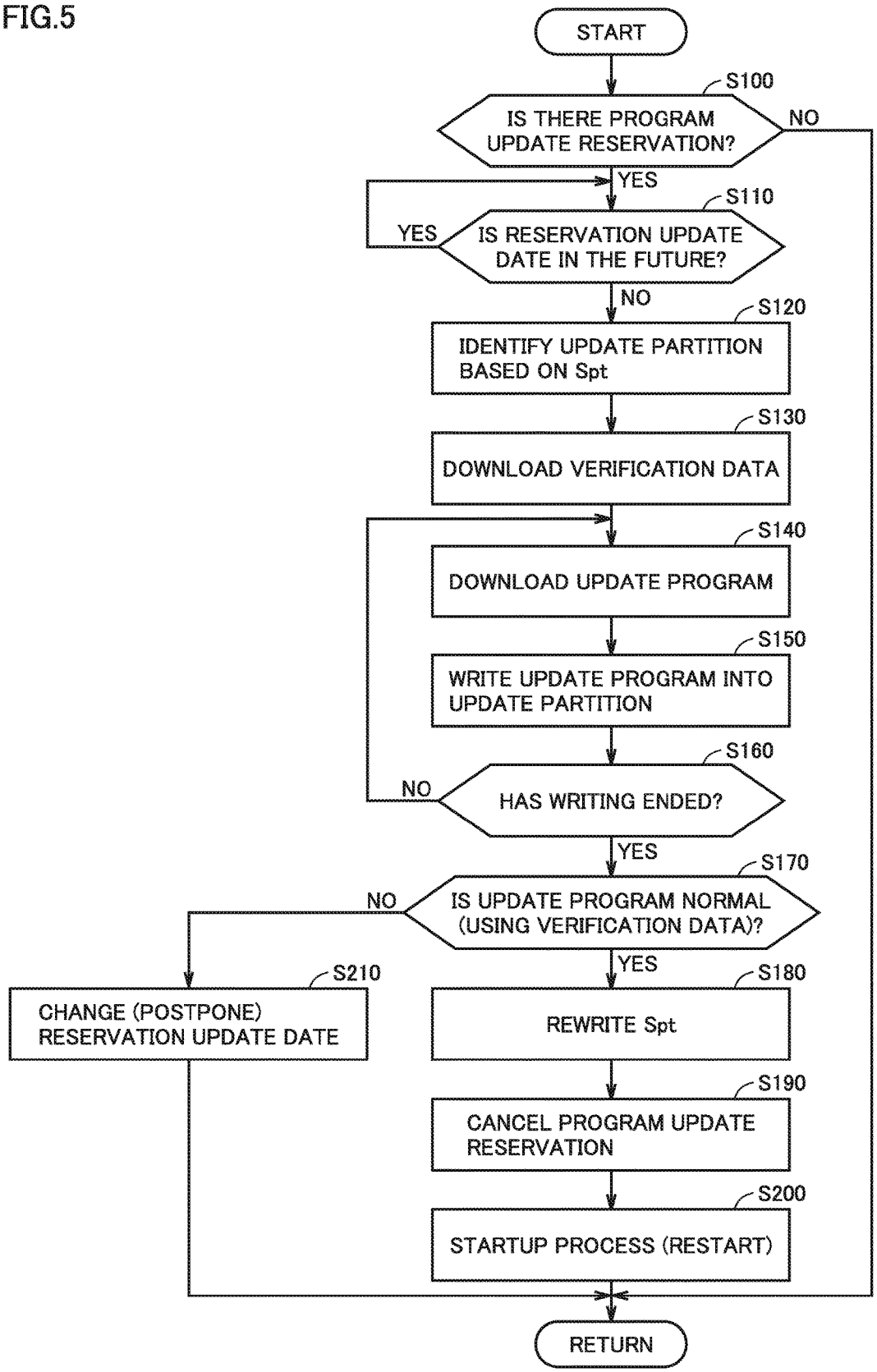
FIG. 5 is a flowchart illustrating a process procedure when program update is performed in the communication adapter according to the first embodiment.

FIG. 5 is a flowchart illustrating a process procedure when program update is performed in the communication adapter according to the first embodiment. The control process shown in FIG. 5 can be repeatedly executed by controller 41 of communication adapter 40.

Referring to FIG. 5, in step S100, controller 41 determines whether or not there is a program update reservation transmitted from management center 20. For example, in the case of updating the program of communication adapter 40, management center 20 transmits a program update reservation and a reservation update date to communication adapter 40 in response to the above-described heartbeat communication. When there is no such a program update reservation (NO in S100), the program update process in step S110 and the subsequent steps is not started up.

When there is a program update reservation (YES in S100), controller 41 compares the reservation update date with the current time in step S110. When the reservation update date comes and determination of NO is made in step S110, controller 41 moves the process to step S120 and the subsequent steps. On the other hand, until the update date comes (YES in S110), the process in step S120 and the subsequent steps is not started up and the process is awaited until the update date comes.

In step S120, based on partition selection data Spt, controller 41 identifies a partition into which the downloaded program should be written (hereinafter also referred to as "update partition"). The update partition is a partition different from a partition in which a currently-executed program is stored. Namely, in the flowchart in FIG. 5, the partition in which the currently-executed program is stored corresponds to "first program storage area", and the update partition corresponds to "second program storage area".

For example, when the first byte of partition selection data Spt is "0 (hexadecimal notation)", the program stored in partition PT0 is currently in execution, and thus, partition PT1 is identified as the update partition. Namely, partition PT0 corresponds to "first program storage area", and partition PT1 corresponds to "second program storage area".

In contrast, when the first byte of partition selection data Spt is "1 (hexadecimal notation)", partition PT0 is identified as the update partition. Namely, partition PT1 corresponds to "first program storage area", and partition PT0 corresponds to "second program storage area".

In step S130, controller 41 downloads verification data for the update program from management center 20 using communication unit 43. The verification data can be created by, for example, CRC (Cyclic Redundancy Check) that is one type of error detection code. Furthermore, in step S140, controller 41 downloads the update program from management center 20. In step S150, controller 41 sequentially writes the downloaded update program into the update partition identified in step S120. Controller 41 repeats the process in steps S140 and S150 until writing of the update program ends (NO in S160).

When writing of the update program ends (YES in S160), controller 41 moves the process to step S170 and determines, using the verification data, whether or not the update program written into the update partition is normal.

When the written update program is normal (YES in S170), controller 41 rewrites partition selection data Spt in step S180. Specifically, partition selection data Spt is rewritten to the contents indicating the update partition identified in step S120. Namely, when the update partition is PT0, the first byte of partition selection data Spt is rewritten to "0 (hexadecimal notation)". Conversely, when the update partition is PT1, the first byte of partition selection data Spt is rewritten to "1 (hexadecimal notation)". Furthermore, in step S190, controller 41 cancels the program update reservation.

Furthermore, in step S200, controller 41 re-executes the startup process. Thus, the startup process is executed in accordance with partition selection data Spt rewritten in step S180. As a result, the update program downloaded from management center 20 is loaded from ROM 45a into RAM 45b and communication adapter 40 is restarted. Thus, the operation of communication adapter 40 can be controlled in accordance with the update program. Cancellation of the program update reservation (S190) can also be performed after restart in step S200.

On the other hand, when the written update program is not normal (NO in S170), controller 41 skips steps S180 to S200 and ends the process after execution of step S210. In step S210, the program update reservation is maintained and the update date is postponed. For example, the update date is rewritten to the same time one day after (24 hours after). As a result, when controller 41 re-executes the control process in FIG. 5, determination of YES is made in step S100, and determination of NO is made in step S110 when the changed update date comes, and thus, the above-described program update process in step S120 and the subsequent steps is executed again.

As described above, in the communication adapter according to the first embodiment, a plurality of program storage areas (partitions) can be provided and the update program downloaded from the server can be written into the partition different from the partition in which the currently-executed program is stored. Furthermore, when writing of the update program ends normally, the communication adapter can be restarted to operate using the update program.

As a result, remote program update by distribution from management center 20 can be achieved without requiring the program update work by the operator, while maintaining the powered-on state of communication adapter 40.

Second Embodiment

In the communication adapter according to the embodiment, the update program distributed from the server is written into the memory (ROM), with the communication adapter maintained in the powered-on state. Therefore, due to a trouble such as occurrence of a power failure during the process of writing the update program, the stored contents of the partition selection data and/or the update program may take an abnormal value. If the communication adapter is started up using such an abnormal value, it is concerned that communication adapter 40 can no longer operate normally.

Particularly, the communication adapter has the function of communicating with the server. Therefore, if this communication function is not normally performed after restart by the update program, the update process for returning to the normal program cannot possibly be performed on the server side. Therefore, control for protection against the abnormality in the program update process will be described in second and subsequent embodiments.

Figure 6:
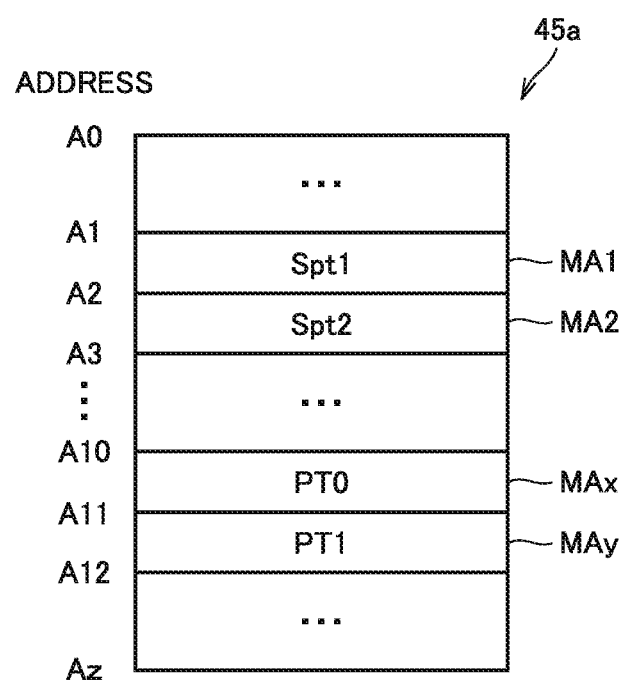
FIG. 6 is a memory map of a ROM in a communication adapter according to a second embodiment.

FIG. 6 is a memory map of ROM 45a in a communication adapter according to the second embodiment.

Comparing FIG. 6 with FIG. 4, in the communication adapter according to the second embodiment, duplexed partition selection data Spt1 and Spt2 are stored in ROM 45a for backup. For example, partition selection data Spt1 is stored in address area MA1 corresponding to addresses A1 to A2, and partition selection data Spt2 serving as a backup is stored in an address area MA2 corresponding to addresses A2 to A3. In the second embodiment as well, storage in partitions PT0 and PT1 for program storage is the same as FIG. 4, and thus, detailed description will not be repeated. Partition selection data Spt1 corresponds to one example of "first selection data", and partition selection data Spt2 corresponds to one example of "second selection data".

When ROM 45a is configured by a flash memory, the contents stored in a corresponding address area are entirely erased, and then, a new data value for selecting partition PT0 or PT1 is written at the time of rewriting of the partition selection data. When the contents are entirely erased, all bits in this address area are set at "1". When a power failure and the like occur in this state, the first byte of partition selection data Spt1 becomes "ffff (hexadecimal notation)" and neither partition PT0 nor PT1 can be specified. When the startup process is executed in such a state, it is concerned that the partition from which the program is read cannot be selected and communication adapter 40 cannot be started up.

In the communication adapter according to the second embodiment, the backup is provided for the partition selection data, which reduces the risk of being unable to start up communication adapter 40 due to the defect in the partition selection data. On the other hand, a plurality of pieces of partition selection data are provided, and thus, a new process is required for selection of the partition from which the program is read at the time of the startup process.

Figure 7:
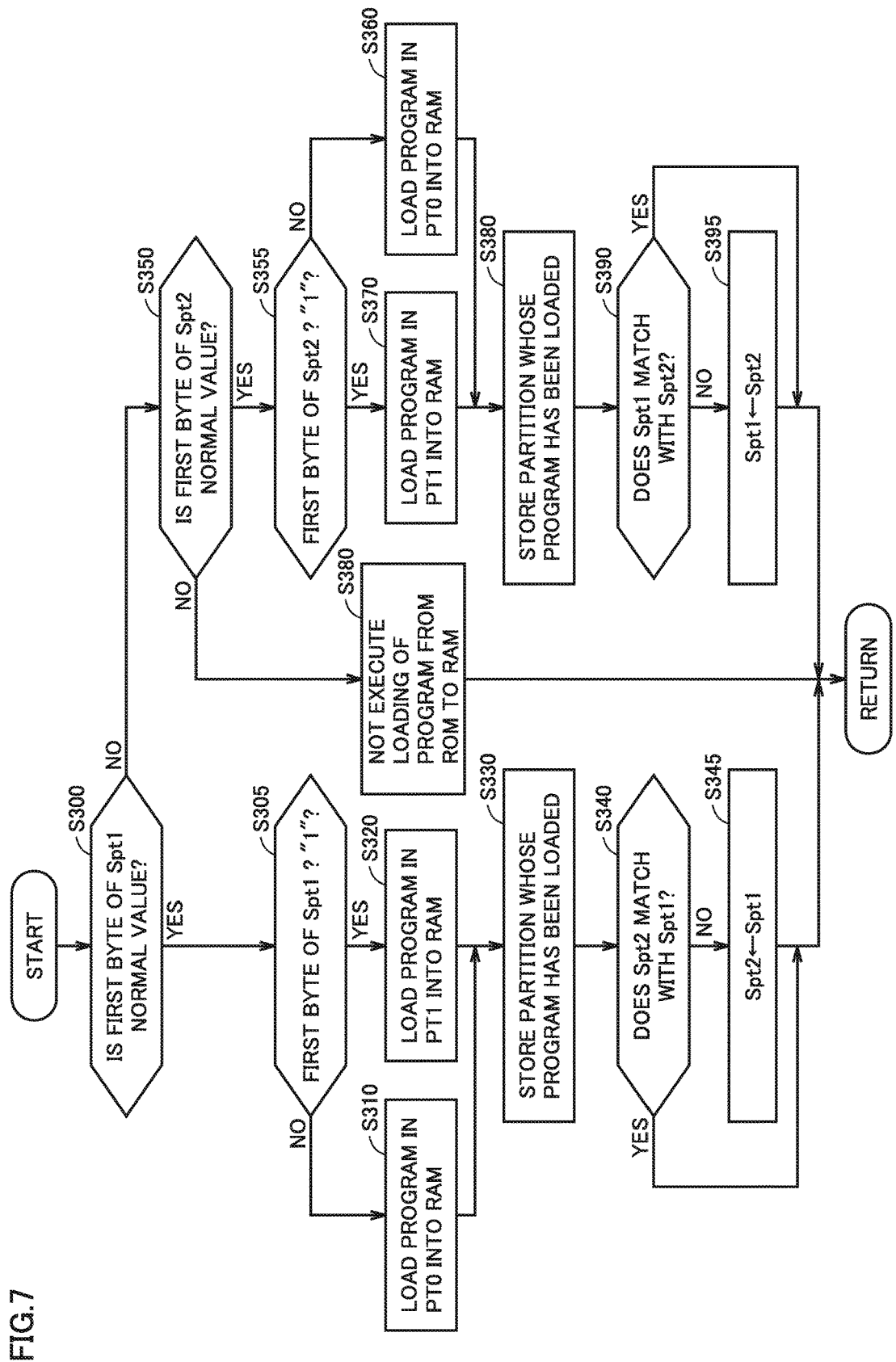
FIG. 7 is a flowchart showing a process procedure for selecting a partition from which a program is read at the time of a startup process in the communication adapter according to the second embodiment.

FIG. 7 is a flowchart showing a process procedure for selecting the partition from which the program is read at the time of the startup process in the communication adapter according to the second embodiment. The control process shown in FIG. 7 is executed by controller 41 as a part of the startup process.

In step S300, controller 41 determines whether or not the first byte of partition selection data Spt1 is a normal value. When the first byte is "1 (hexadecimal notation)" or "0 (hexadecimal notation)", determination of YES is made in step S300.

When the first byte of partition selection data Spt1 is "1 (hexadecimal notation)" (YES in S305), controller 41 loads the program stored in partition PT1 into RAM 45b in step S320. On the other hand, when the first byte of partition selection data Spt1 is "0 (hexadecimal notation)" (NO in S305), controller 41 loads the program stored in partition PT0 into RAM 45b in step S310.

When the program has been read based on partition selection data Spt1, controller 41 stores the partition whose program has been loaded in this startup process in step S330. Namely, partition PT0 is stored when step S310 is performed, and partition PT1 is stored when step S320 is performed.

Furthermore, in step S340, controller 41 determines whether or not partition selection data Spt2 for backup matches with partition selection data Spt1 used to read the program. When partition selection data Spt2 does not match with partition selection data Spt1 (NO in S340), partition selection data Spt2 is rewritten to the same contents as those of partition selection data Spt1 in step S345. When partition selection data Spt2 matches with partition selection data Spt1 (YES in S340), the process in step S345 is skipped.

As described above, when partition selection data Spt1 is a normal value, the partition from which the program is read at the time of the startup process is selected using partition selection data Spt1 in steps S300 to S345.

In contrast, when the first byte of partition selection data Spt1 is neither "0 (hexadecimal notation)" nor "1 (hexadecimal notation)" (NO in S300), controller 41 determines in step S350 whether or not the first byte of partition selection data Spt2 is a normal value. When the first byte is "1 (hexadecimal notation)" or "0 (hexadecimal notation)", determination of YES is made in step S350.

When the first byte of partition selection data Spt2 is "1 (hexadecimal notation)" (YES in S355), controller 41 loads the program stored in partition PT1 into RAM 45b in step S370. On the other hand, when the first byte of partition selection data Spt2 is "0 (hexadecimal notation)" (NO in S355), controller 41 loads the program stored in partition PT0 into RAM 45b in step S360.

When the program has been read based on partition selection data Spt2, controller 41 stores the partition whose program has been loaded in this startup process in step S380. Namely, partition PT0 is stored when step S360 is performed, and partition PT1 is stored when step S370 is performed.

Furthermore, in step S390, controller 41 compares partition selection data Spt2 for backup with partition selection data Spt1. When partition selection data Spt2 does not match with partition selection data Spt1 (NO in S390), partition selection data Spt1 is rewritten to the same contents as those of partition selection data Spt2 in step S395. When partition selection data Spt2 matches with partition selection data Spt1 (YES in S390), the process in step S395 is skipped.

As described above, when partition selection data Spt2 for backup is a normal value even if partition selection data Spt1 is an abnormal value, the partition from which the program is read at the time of the startup process can be selected using partition selection data Spt2 in steps S350 to S395. When neither partition selection data Spt1 nor partition selection data Spt2 is a normal value (NO in S350), the partition from which the program is read cannot be selected. Therefore, in step S380, loading of the program from ROM 45a into RAM 45b is not executed.

As described in the first embodiment, partition selection data Spt is also used to identify the update partition in step S120 in FIG. 5. Therefore, in the second embodiment using partition selection data Spt1 and Spt2, the process of identifying the update partition (step S120 in FIG. 5) in the program update process is changed to a process shown in FIG. 8 or 9.

Figure 8:
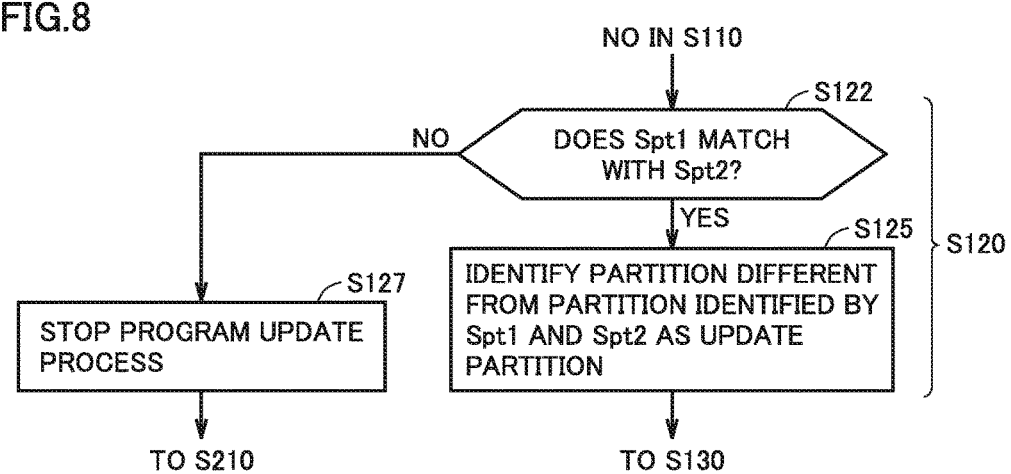
FIG. 8 is a flowchart illustrating a first example of a process of identifying an update partition when program update is performed in the communication adapter according to the second embodiment.

FIG. 8 is a flowchart illustrating a first example of the process of identifying the update partition when program update is performed in the communication adapter according to the second embodiment.

Referring to FIG. 8, in the first example, step S120 in FIG. 5 has steps S122, S125 and S127.

In step S122, controller 41 determines whether or not partition selection data Spt1 matches with partition selection data Spt2. When partition selection data Spt1 matches with partition selection data Spt2 (YES in S122), a partition different from the partition identified by partition selection data Spt1 and Spt2 together is identified as the update partition in step S125. Furthermore, the process proceeds to step S130 and the subsequent steps, and the update program distributed from management center 20 is written into the update partition identified in step S125.

In contrast, when partition selection data Spt1 does not match with partition selection data Spt2 (NO in S122), controller 41 cannot identify the update partition, and thus, moves the process to step S127 and stops the program update process. Furthermore, the process proceeds to step S210 and the program update process at this update date is ended.

Figure 9:
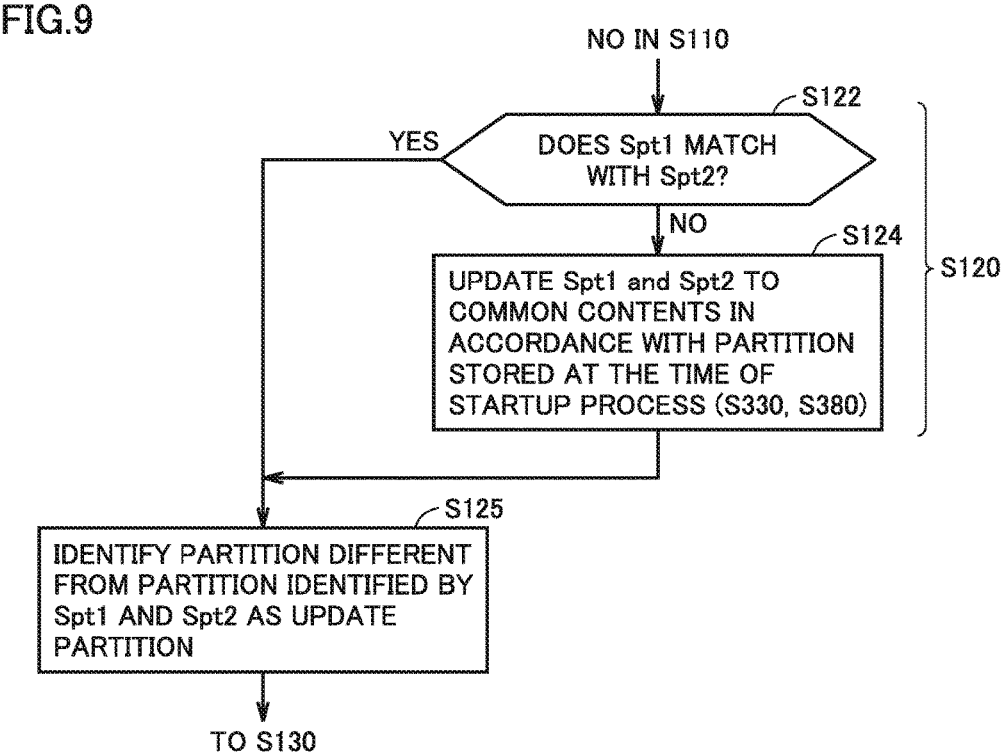
FIG. 9 is a flowchart illustrating a second example of the process of identifying the update partition when program update is performed in the communication adapter according to the second embodiment.

FIG. 9 shows a second example of the process of identifying the update partition when program update is performed in the communication adapter according to the second embodiment.

Referring to FIG. 9, in the second example, step S120 shown in FIG. 5 has steps S122, S124 and S125.

Similarly to FIG. 8, in step S122, controller 41 determines whether or not partition selection data Spt1 matches with partition selection data Spt2. When partition selection data Spt1 matches with partition selection data Spt2 (YES in S122), controller 41 identifies the update partition in step S125 similarly to FIG. 8. In this case, the process proceeds to step S130 and the subsequent steps, and the update program distributed from management center 20 is written into the identified update partition.

In contrast, when partition selection data Spt1 does not match with partition selection data Spt2 (NO in S122), controller 41 moves the process to step S124. In step S124, in accordance with the contents stored in step S330 or S380 in FIG. 7, partition selection data Spt1 and Spt2 are updated to the common contents indicating the partition from which the program is read at the time of the startup process. Furthermore, the process proceeds to step S125 and a partition different from the partition identified by updated partition selection data Spt1 and Spt2 together is identified as the update partition.

Therefore, in the process according to the second example, even if partition selection data Spt1 does not match with partition selection data Spt2, the update partition can be identified in accordance with actual selection of the partition at the time of the startup process.

Through FIGS. 8 and 9, execution of the process of writing the update program as it is when partition selection data Spt1 does not match with partition selection data Spt2 is avoided. Thus, false rewriting of the program that is currently running normally can be prevented. As a result, the risk of being unable to execute the next startup process when an abnormality such as a power failure occurs during the program update process can be reduced.

As described above, in the communication adapter according to the second embodiment, the partition selection data is duplexed, which can reduce the risk of being unable to start up the communication adapter due to the defect in the partition selection data.

Third Embodiment

In a third embodiment, an emergency mode of manually executing the startup process (hereinafter also referred to as "manual restart mode") is introduced in addition to the remote program update process described in the first and second embodiments.

Figure 10:
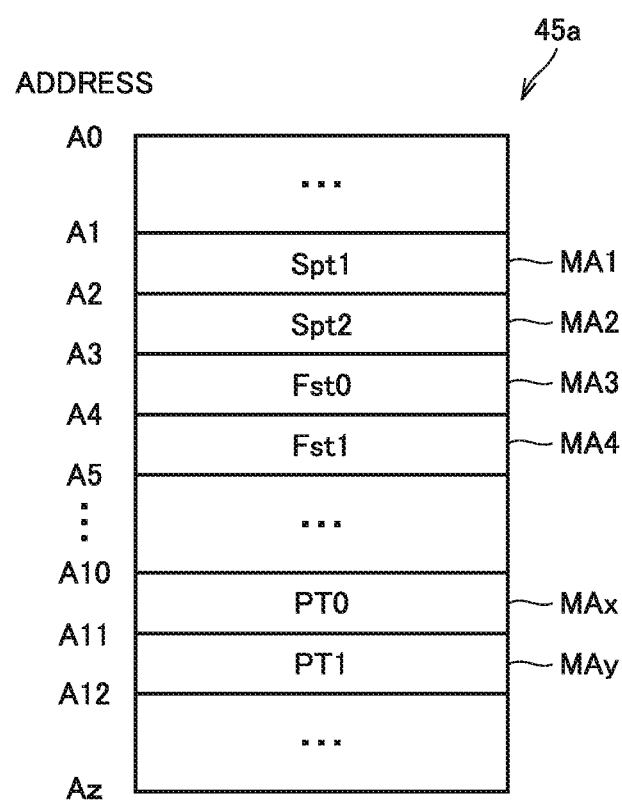
FIG. 10 is a memory map of a ROM in a communication adapter according to a third embodiment.

FIG. 10 is a memory map of ROM 45a in a communication adapter according to the third embodiment.

Comparing FIG. 10 with FIG. 6, in the communication adapter according to the third embodiment, program storage state data Fst0 and Fst1 are further stored in ROM 45a for partitions PT0 and PT1, respectively. Program storage state data Fst0 is stored in an address area MA3 corresponding to addresses A3 to A4. Program storage state data Fst1 is stored in an address area MA4 corresponding to addresses A4 to A5. Program storage state data Fst0 indicates whether or not the program has been normally written into partition PT0. Similarly, program storage state data Fst1 indicates whether or not the program has been normally written into partition PT1. Program storage state data Fst0 and Fst1 correspond to one example of "first program storage state data" and "second program storage state data", respectively.

In the third embodiment as well, storage in partitions PT0 and PT1 for program storage as well as storage of partition selection data Spt or Spt1 and Spt2 are the same as FIG. 4 or 6, and thus, detailed description will not be repeated.

FIG. 11 is a table showing a list of processes executed on program storage state data Fst0 and Fst1.

Referring to FIG. 11, a program is written into only one of partitions PT0 and PT1 at the time of shipment from a factory. For example, the program is stored in partition PT0, whereas no program is written into partition PT1. At this time, "predetermined value (hexadecimal notation)" is written into the first byte of program storage state data Fst0 of partition PT0 having the program stored therein. On the other hand, the predetermined value is not written into program storage state data Fst1 of partition PT1 and program storage state data Fst1 is, for example, in the initial state (erased state) in which all bits are "1".

In the program update process, in step S120 in FIG. 5, the update partition into which the update program is written is identified based on partition selection data Spt (or Spt1 and Spt2). In response to this, program storage state data Fst0 or Fst1 corresponding to the update partition is brought into the erased state (all bits are "1"). For example, when partition PT0 is specified as the update partition, all bits of program storage state data Fst0 are set at "1".

In the program update process, in step S180 in FIG. 5, after the update program is normally written into the update partition, partition selection data Spt (or Spt1 and Spt2) is rewritten to the contents indicating the update partition. In response to this, "predetermined value (hexadecimal notation)" is written into the first byte of program storage state data Fst0 or Fst1 corresponding to the update partition. For example, when the update program is normally written into partition PT0, "predetermined value (hexadecimal notation)" is written into the first byte of program storage state data Fst0.

When the update program is written into partition PT1 during execution of the program written into partition PT0 at the time of shipment from a factory, a state is brought about in which "predetermined value (hexadecimal notation)" has been written into the first bytes of both of program storage state data Fst0 and Fst1.

In the startup process shown in FIG. 7, the program stored in partition PT0 is loaded into RAM 45b in step S310 or S360. At this time, program storage state data Fst0 corresponding to partition PT0 is checked. If "predetermined value (hexadecimal notation)" has not been written into the first byte of program storage state data Fst0, "predetermined value (hexadecimal notation)" is written into the first byte of program storage state data Fst0.

Similarly, the program stored in partition PT1 is loaded into RAM 45b in step S320 or S370 in FIG. 7. At this time, program storage state data Fst1 corresponding to partition PT1 is checked. Namely, if "predetermined value (hexadecimal notation)" has not been written into the first byte of program storage state data Fst1, "predetermined value (hexadecimal notation)" is written into the first byte of program storage state data Fst1.

As described above, for partitions PT0 and PT1, it can be checked whether or not the program has been normally written, based on program storage state data Fst0 and Fst1, respectively.

Figure 12:
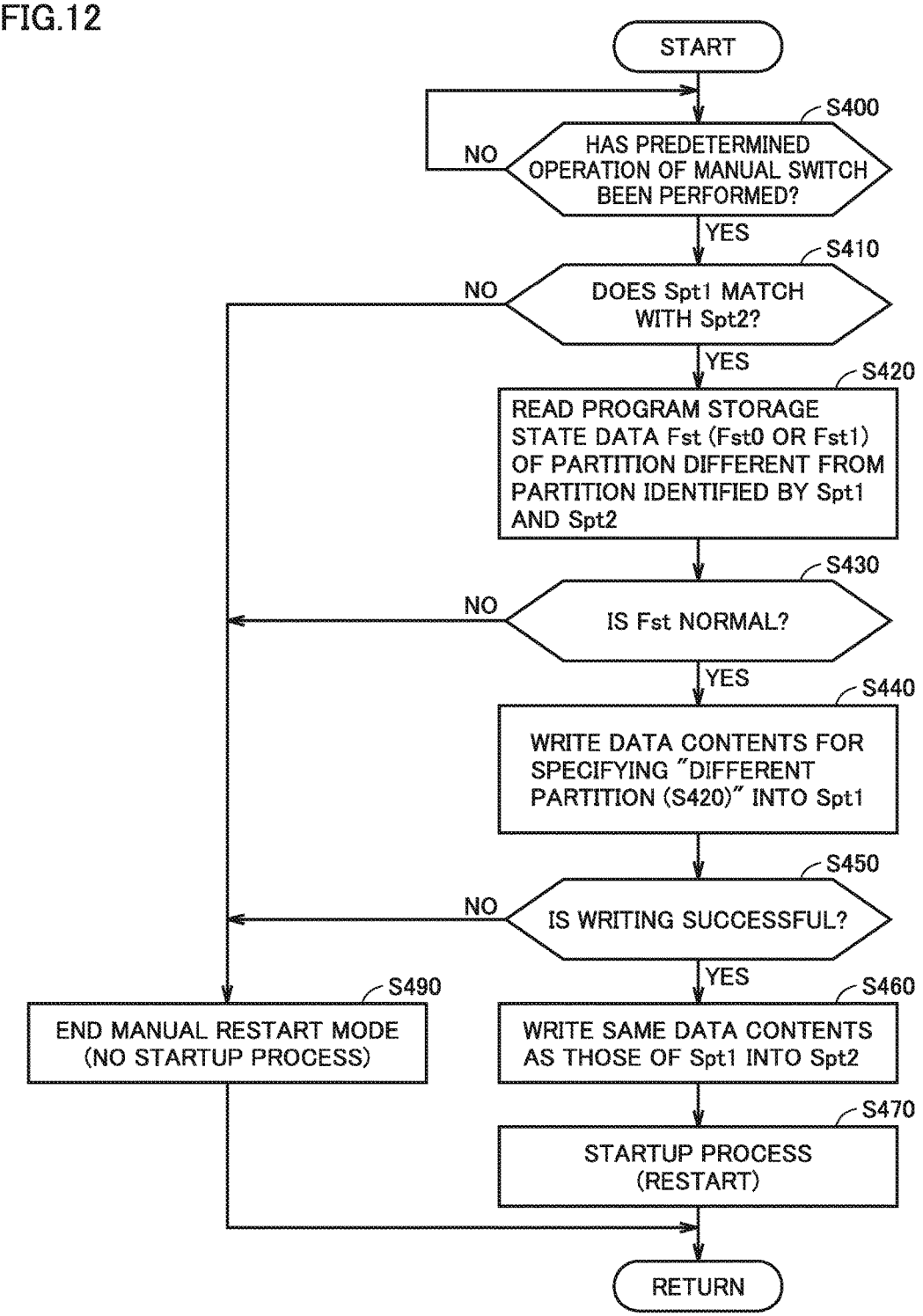
FIG. 12 is a flowchart illustrating a process procedure of a forcible manual restart mode in the communication adapter according to the third embodiment.

FIG. 12 is a flowchart illustrating a process procedure of the forcible manual restart mode in the communication adapter according to the third embodiment. The control process shown in FIG. 12 can be executed by controller 41 of communication adapter 40.

In step S400, controller 41 determines whether or not a predetermined operation of manual switch 49 (FIG. 3) has been performed. For example, when an operation of pressing a part of the plurality of manual switches for a long time (continuation of the ON state for a time period exceeding a predetermined time period) is performed, determination of YES is made in step S400. When determination of NO is made in step S400, the process in step S410 and the subsequent steps is not started up.

When the predetermined operation of manual switch 49 is sensed (YES in S400), controller 41 starts up the manual restart mode. In step S410, controller 41 first determines whether or not partition selection data Spt1 matches with partition selection data Spt2. When partition selection data Spt1 matches with partition selection data Spt2 (YES in S410), controller 41 specifies a partition different from the partition selected by partition selection data Spt1 and Spt2 together, and reads program storage state data Fst (Fst0 or Fst1) corresponding to the different partition in step S420. Namely, when partition PT0 is selected based on partition selection data Spt1 and Spt2, Fst=Fst1. Conversely, when partition PT1 is selected based on partition selection data Spt1 and Spt2, Fst=Fst0.

In step S430, controller 41 determines whether or not program storage state data Fst read in step S420 is normal. Namely, when "predetermined value (hexadecimal notation)" has been written into the first byte of program storage state data Fst read in step S420, determination of YES is made in step S430. Otherwise, determination of NO is made in step S430.

When determination of YES is made in step S430, controller 41 moves the process to step S440 and writes the data contents for identifying the different partition identified in step S420 into partition selection data Spt1. When writing into partition selection data Spt1 is successful (YES in S450), controller 41 writes the same data contents as those of partition selection data Spt1 into partition selection data Spt2 as well in step S460.

Then, in step S470, controller 41 re-executes the startup process in accordance with partition selection data Spt1 and Spt2 written in steps S440 and S460. As a result, the program is loaded into RAM 45b from the partition different from the partition in which the currently-executed program is stored, and communication adapter 40 is restarted. Thus, the startup process can be re-executed in accordance with the switched program. For example, when the update program loaded into RAM 45b has a trouble and does not operate normally, the manual restart mode by operation of manual switch 49 allows startup of communication adapter 40 using a program version earlier than that of the update program.

On the other hand, when partition selection data Spt1 does not match with partition selection data Spt2 (NO in S410), when the program has not been normally written into "different partition" specified in step S420 (NO in S430), or when the partition selection data cannot be written normally (NO in S450), controller 41 moves the process to step S490 and forces the manual restart mode to end without re-executing the startup process in accordance with the switched program. As a result, further worsening of the situation caused by execution of restart using the incomplete program can be prevented.

As described above, in the communication adapter according to the third embodiment, at the time of execution of the program read from one partition, the manual restart mode allows forcible execution of the startup process in accordance with the program stored in the other partition. As a result, when an abnormality occurs due to the faulty update program, the manual operation allows forcible restart of communication adapter 40 using the program version earlier than that of the update program.

The present disclosure is not limited to the above-described embodiments and design changes can be made as appropriate. For example, three or more partitions can also be provided to store the program (firmware). With such a configuration as well, the program update process can be executed in accordance with the similar procedure, by specifying the partition in which the currently-executed program is stored and the partition in which the update program is stored, of the three or more partitions.

In addition, communication adapter 40 may be built into a housing of hot water supply apparatus 100. In this case, a communication line connecting communication adapter 40 to a controller (not shown) of hot water supply apparatus 100 may be an internal wiring of the housing. Furthermore, the controller of hot water supply apparatus 100 and communication adapter 40 can also be mounted on the same substrate. In this case, the communication line (two-wire communication line 50 in FIG. 1) may be replaced with a wiring pattern on the substrate.

Although the embodiments of the present disclosure have been described, it should be understood that the embodiments disclosed herein are illustrative and not limitative in any respect. The scope of the present disclosure is defined by the terms of the claims, and is intended to include any modifications within the scope and meaning equivalent to the terms of the claims.

What is claimed is:

1. A communication adapter connected to a hot water using facility via a communication line, the communication adapter comprising:
   a communication circuit configured to receive and transmit information from and to an external apparatus via a communication network;
   a memory including a plurality of program storage areas whose stored contents are rewritable; and
   a controller configured to operate the communication adapter by execution of a program stored in any one of the plurality of program storage areas specified at the time of a startup process,
   when a program update process is started up during execution of a program stored in a first program storage area of the plurality of program storage areas, the controller executing a process of writing an update program received by the communication circuit from the external apparatus into a second program storage area, the second program storage area being a program storage area of the plurality of program storage areas different from the first program storage area,
   when the process of writing ends normally, the controller specifying the second program storage area and re-executing the startup process, wherein
   at the time of the startup process, the controller specifies one of the plurality of program storage areas in accordance with at least one of first and second selection data indicating common information for selecting the one of the plurality of program storage areas,
   in response to normal end of the process of writing the update program, the first and second selection data are updated to have a common content indicating the program storage area subjected to the process of writing, of the plurality of program storage areas,
   the startup process is re-executed after the first and second selection data are updated, and
   when only one selection data of the first and second selection data is abnormal at the time of the startup process, the controller specifies the one of the plurality of program storage areas in accordance with the other selection data of the first and second selection data, and updates a content of the one selection data to the same content as that of the other selection data.

2. A communication adapter connected to a hot water using facility via a communication line, the communication adapter comprising:
   a communication circuit configured to receive and transmit information from and to an external apparatus via a communication network;
   a memory including a plurality of program storage areas whose stored contents are rewritable; and
   a controller configured to operate the communication adapter by execution of a program stored in any one of the plurality of program storage areas specified at the time of a startup process,
   when a program update process is started up during execution of a program stored in a first program storage area of the plurality of program storage areas, the controller executing a process of writing an update program received by the communication circuit from the external apparatus into a second program storage area, the second program storage area being a program storage area of the plurality of program storage areas different from the first program storage area,
   when the process of writing ends normally, the controller specifying the second program storage area and re-executing the startup process, wherein
   at the time of the startup process, the controller specifies one of the plurality of program storage areas in accordance with at least one of first and second selection data indicating common information for selecting the one of the plurality of program storage areas,
   in response to normal end of the process of writing the update program, the first and second selection data are updated to have a common content indicating the program storage area subjected to the process of writing, of the plurality of program storage areas,
   the startup process is re-executed after the first and second selection data are updated, and
   the controller does not execute the process of writing the update program at startup of the program update process, in such a state that the program storage areas identified by the first and second selection data are different from each other.

3. A communication adapter connected to a hot water using facility via a communication line, the communication adapter comprising:
   a communication circuit configured to receive and transmit information from and to an external apparatus via a communication network;
   a memory including a plurality of program storage areas whose stored contents are rewritable; and
   a controller configured to operate the communication adapter by execution of a program stored in any one of the plurality of program storage areas specified at the time of a startup process,
   when a program update process is started up during execution of a program stored in a first program storage area of the plurality of program storage areas, the controller executing a process of writing an update program received by the communication circuit from the external apparatus into a second program storage area, the second program storage area being a program storage area of the plurality of program storage areas different from the first program storage area,
   when the process of writing ends normally, the controller specifying the second program storage area and re-executing the startup process, wherein
   at the time of the startup process, the controller specifies one of the plurality of program storage areas in accordance with at least one of first and second selection data indicating common information for selecting the one of the plurality of program storage areas, in response to normal end of the process of writing the update program, the first and second selection data are updated to have a common content indicating the program storage area subjected to the process of writing, of the plurality of program storage areas, the startup process is re-executed after the first and second selection data are updated, the communication adaptor further comprises a manual switch configured to provide an instruction to re-execute the startup process when being operated, when the manual switch is operated, the controller specifies the program storage area not selected by the first and second selection data, of the plurality of program storage areas, and re-executes the startup process, the memory further stores a plurality of pieces of program storage state data provided to correspond to the plurality of program storage areas, respectively, (i) in response to normal end of a process of writing a program into one of the plurality of program storage areas by the time of shipment from a factory, and (ii) in response to normal end of the process of writing the update program into one of the plurality of program storage areas, a predetermined content is written on a corresponding one of the plurality of pieces of program storage state data, and the controller stops re-execution of the startup process in a case where the specified program storage state data does not match with the predetermined content when the manual switch is operated, the specified program storage state data corresponding to the program storage area specified as not selected by the first and second selection data.

4. A program update method for a communication adapter connected to a hot water using facility via a communication line, and being able to receive and transmit information from and to an external apparatus via a communication network, the program update method comprising:

starting up a program update process in accordance with the information from the external apparatus during operation of the communication adapter by execution of a program stored in any one of a plurality of program storage areas specified at the time of a startup process, stored contents of the plurality of program storage areas being rewritable;

when the program update process is started up during execution of a program stored in a first program storage area of the plurality of program storage areas, executing a process of writing an update program distributed from the external apparatus into a second program storage area different from the first program storage area;

when the process of writing the update program into the second program storage area ends normally, specifying the second program storage area and re-executing the startup process;

at the time of the startup process, specifying one of the plurality of program storage areas from which the program is read, in accordance with at least one of first and second selection data indicating common information for selecting the one of the plurality of program storage areas;

in response to normal end of the process of writing the update program, updating the first and second selection data to have a common content indicating the program storage area subjected to the process of writing, of the plurality of program storage areas; and re-executing the startup process after updating the first and second selection data;

wherein the communication adapter is provided with a manual switch configured to provide an instruction to re-execute the startup process when being operated, the program update method further comprises when the manual switch is operated, specifying the program storage area not selected by the first and second selection data, of the plurality of program storage areas, and re-executing the startup process, a plurality of pieces of program storage state data are provided to correspond to the plurality of program storage areas, respectively, (i) in response to normal end of a process of writing a program into one of the plurality of program storage areas by the time of shipment from a factory, and (ii) in response to normal end of the process of writing the update program into one of the plurality of program storage areas, a predetermined content is written on a corresponding one of the plurality of pieces of program storage state data, and the program update method further comprises stopping re-execution of the startup process in a case where the specified program storage state data does not match with the predetermined content when the manual switch is operated, the specified program storage state data corresponding to the program storage area specified as not selected by the first and second selection data.

\* \* \* \* \*